UNITED STATES PATENT OFFICE.

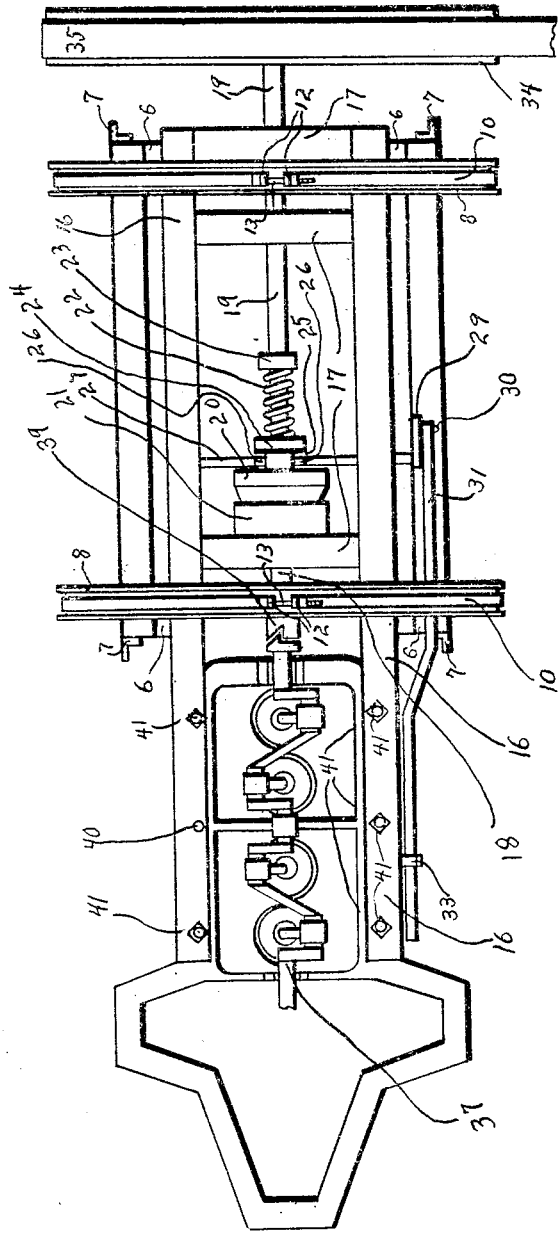

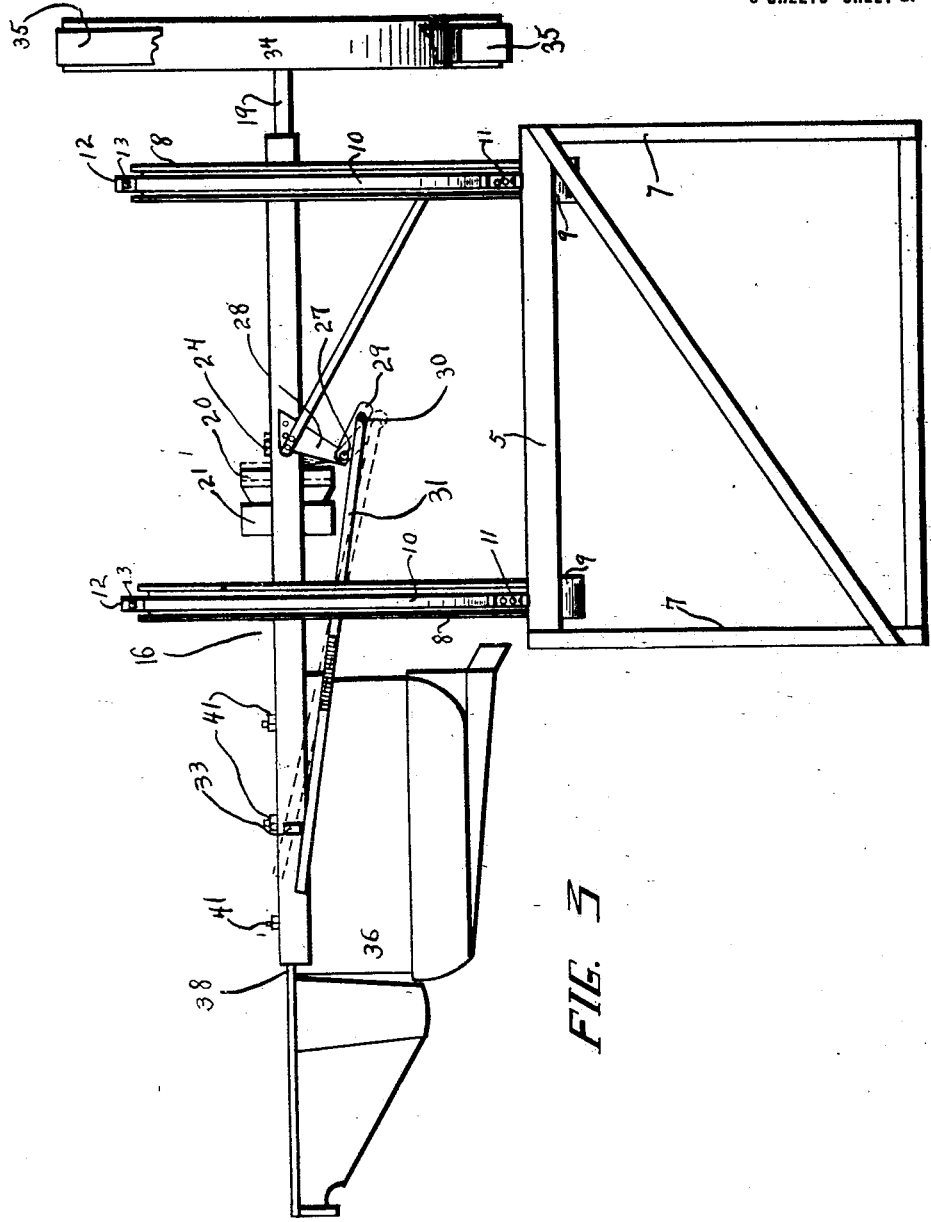

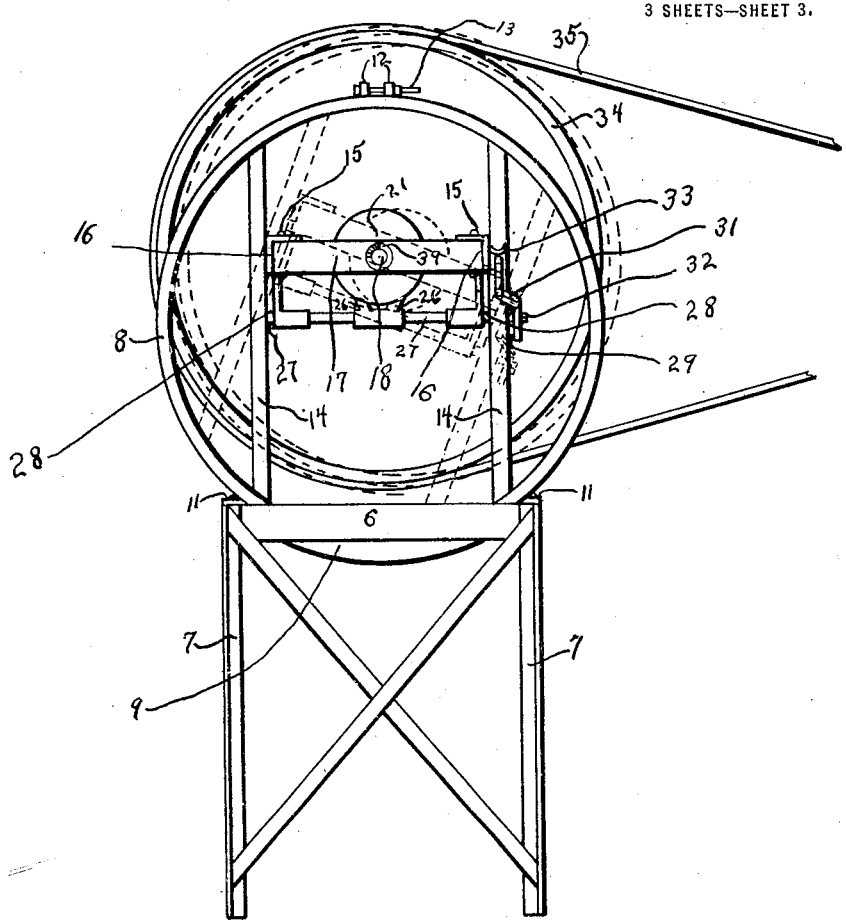
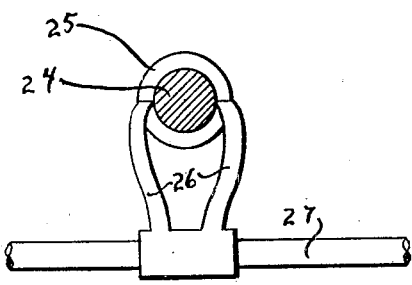

GEORGE L. PIERCE AND CLARENCE D. PIERCE, OF WATERBURY, NEBRASKA.

MOTOR-SUPPORTING STAND.

1,370,838.  Specification of Letters Patent.  Patented Mar. 8, 1921.

Application filed February 16, 1920. Serial No. 359,195.

*To all whom it may concern:*

Be it known that we, GEORGE L. PIERCE and CLARENCE D. PIERCE, citizens of the United States, and residents of Waterbury, in the county of Dixon and State of Nebraska, have invented certain new and useful Improvements in Motor-Supporting Stands, of which the following is a specification.

In repairing and overhauling that make of vehicle motor now in most common use, such as grinding and reseating its valves, removing carbon deposits, adjusting bearings, etc., the work is attended with much difficulty due to the inaccessibility of the parts, without removal of the motor from the vehicle.

Our present invention has, therefore, for its primary object the production of a stand particularly adapted to support a vehicle motor in the most advantageous positions for working on its respective parts.

Another object of the invention is the production of a stand particularly adapted to support a vehicle motor and so constructed that the motor may be inverted or tilted to convenient positions for the workman making adjustments and repairs, and yet held firmly in any of such positions.

Furthermore the invention contemplates a stand for vehicle motors embodying a support for the motor adapted to tilt on the stand to place the motor in any desired inclination and having a driving mechanism to which the motor crank-shaft may be operatively connected.

With these and other objects in view, the invention consisting in the construction, combination and novel arrangement of parts will be fully understood from the following description, reference being had to the accompanying drawings, which form a part of this application and in which like characters of reference indicate corresponding parts throughout the several views, of which,—

Figure 1 is a plan of a stand constructed in accordance with our invention, a motor being inverted thereon and supported thereby;

Fig. 2 is a fragmentary side elevation of the motor-supporting bars with the motor mounted thereupon in upright position;

Fig. 3 is a side elevation of the device with the motor inverted;

Fig. 4 is an enlarged elevation of the device, the motor being omitted; and

Fig. 5 is an enlarged elevation of the clutch-controlling means.

While we have illustrated and hereinafter described but one embodiment for practising the invention we would not be understood as being limited to such specific construction, for various alterations and modifications may be made in the details of construction and arrangement of parts disclosed without departing from the spirit and scope of the invention as defined in the appended claims.

Referring, now, to the illustrations, our device consists of a suitable stand preferably including an upper frame having side members, 5, and end members, 6; supported by legs, 7.

Upon the stand is mounted the motor support including two axially alined hoops, 8, the lower peripheries of which rest in suitable bearings, 9, carried by the stand. The hoops, 8, are held releasably against rotation by straps, 10, having their lower ends secured, as at 11, to opposite sides of the stand. The straps engage the opposite sides of the hoops and their upper ends are provided with lugs, 12, through which pass bolts, 13, suitable to draw the lugs toward each other.

The hoops carry spaced uprights, 14, to which are suitably secured as at 15, horizontal bars, 16, which overhang one end of the stand. Above the stand said bars, 16, are interconnected by cross members, 17, in which is journaled a driven shaft, 18, and a drive shaft, 19, alined with the shaft, 18, and carrying a free clutch member, 20, normally operatively engaged with a fixed clutch member, 21, on the shaft, 18, by means of a compression spring, 22, interposed between a boss, 23, on the shaft, 19, and the hub, 24, of the clutch member, 20. The hub, 24, is provided with an annular groove, 25, in opposite sides of which are engaged clutch shifting fingers, 26, fixed on the transverse shaft, 27, journaled in suitable bearings, 28, hanging from the bars, 16. On the said shaft is fixed a crank arm, 29, having pivotally secured thereto as at 30, one end of a lever, 31, fulcrumed as at 32, to one of the uprights, 14, whereby oscillation of the lever causes engagement and disengagement of the clutch member, 20, with and from its companion. On the side of the adjacent bar, 16, we provide a stud or hook, 33, over which the free end of the lever, 31, may be sprung as indicated in dotted lines in Fig. 2 to hold the clutch members disengaged.

On the free end of the shaft, 19, we provide a drive pulley, 34, actuated by a belt 35, driven from any suitable source of power. The shafts 18 and 19, we choose to mount eccentrically to the hoops, 8, whereby the belt, 35, may be tightened or loosened by loosening the bolts, 13, and then turning the supporting frame in the appropriate direction as will be clearly understood from Fig. 3.

In Figs. 1, 2 and 3 we have illustrated a conventional type of motor including a flanged cylinder block, 36, and crank shaft, 37, provided on its forward end with the usual crank chuck, 39, on the adjacent end of the shaft, 18.

The overhanging portions of the bars, 16, are provided with bolt holes, 40, positioned to receive the usual bolts, 41, through the flanges of the motor block.

In mounting the motor upon the stand, the hoops, 8, are given a half rotation from the position in which they are shown in Figs. 1, 3 and 4, thus inverting the supporting arms 16, with respect to the position they are shown in said views. The motor, having first been freed from its crank-case and the chassis, is then lifted directly onto the overhanging portions of the arms 16, and securely bolted thereto, as above set forth, and shown in Fig. 2. The hoops, 8, may then be rotated to invert the motor, or tilt it to any angle to best suit the work to be performed thereon; and when it is desired to drive the motor to adapt its newly-adjusted bearings to their journals, the crank shaft is driven through the medium of the shafts, 18 and 19.

Having thus described our invention what we claim as new and desire to secure by Letters Patent of the United States, is,—

1. A support for a vehicle-motor comprising a suitable stand, and a tilting motor support thereon, including a plurality of axially-alined hoops rotatably supported by the stand, means for releasably locking the hoops, cross members secured to the hoops, and a pair of horizontal bars secured to the cross members, and to and between which the motor may be secured.

2. A support for a vehicle-motor cylinder-block and its crank shaft, comprising a suitable stand, a laterally rocking support on the stand to which the cylinder-block may be secured, means for releasably locking the support against rocking, and means carried by the rocking support for driving the crank-shaft, including a rotatable shaft carried by said support and engageable by the crank shaft, a second rotatable shaft carried by said support, clutch mechanism operable to connect and disconnect said shafts, and means for driving said second shaft.

3. A support for a vehicle-motor cylinder-block and crank-shaft, comprising a suitable stand, a motor support, including a plurality of axially-alined hoops rotatably supported on the stand, means for releasably locking the hoops, cross members on the hoops and a pair of horizontal bars carried by the cross members and to which the cylinder-block may be secured, and a drive shaft carried by and eccentrically to the hoops and engageable by the crank-shaft.

In testimony whereof we have hereunto set our hands this 21st day of October, 1919.

GEORGE L. PIERCE.
CLARENCE D. PIERCE